United States Patent
Endo et al.

(10) Patent No.: US 8,368,354 B2
(45) Date of Patent: Feb. 5, 2013

(54) CHARGE CONTROL DEVICE FOR VEHICLE AND ELECTRIC POWERED VEHICLE PROVIDED WITH SAME

(75) Inventors: Hiroki Endo, Toyota (JP); Masaya Yamamoto, Kasugai (JP); Junta Izumi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/384,667

(22) PCT Filed: Jun. 8, 2010

(86) PCT No.: PCT/JP2010/059676
§ 371 (c)(1),
(2), (4) Date: Jan. 18, 2012

(87) PCT Pub. No.: WO2011/024532
PCT Pub. Date: Mar. 3, 2011

(65) Prior Publication Data
US 2012/0268066 A1    Oct. 25, 2012

(30) Foreign Application Priority Data
Aug. 27, 2009    (JP) .................................. 2009-196463

(51) Int. Cl.
*H02J 7/00*    (2006.01)
(52) U.S. Cl. ...................................... 320/109; 320/104
(58) Field of Classification Search .................. 320/109, 320/104
See application file for complete search history.

(56) References Cited

U.S. PATENT DOCUMENTS

| | | | |
|---|---|---|---|
| 7,999,505 B2 * | 8/2011 | Bertness | 320/104 |
| 8,120,328 B2 * | 2/2012 | Eto | 320/150 |
| 2001/0000212 A1 * | 4/2001 | Reipur et al. | 320/104 |
| 2004/0004458 A1 | 1/2004 | Tanaka et al. | |

FOREIGN PATENT DOCUMENTS

| | | |
|---|---|---|
| JP | A-4-88837 | 3/1992 |
| JP | A-7-194015 | 7/1995 |
| JP | A-2003-32801 | 1/2003 |
| JP | A-2004-40928 | 2/2004 |
| JP | A-2005-227072 | 8/2005 |
| JP | A-2007-327823 | 12/2007 |

OTHER PUBLICATIONS

International Search Report dated Sep. 14, 2010 in International Application No. PCT/JP2010/059676 (with translation).

* cited by examiner

*Primary Examiner* — M'Baye Diao
(74) *Attorney, Agent, or Firm* — Oliff & Berridge, PLC

(57) ABSTRACT

A monitoring unit outputs a first current detection value having a relatively wide measurement range and a relatively short detection cycle and a second current detection value having a relatively high resolution, to a charging ECU. When charging power calculated using the first current detection value exceeds a predetermined limit value, the charging ECU controls a charger to reduce charging power (protection control). Further, the charging ECU controls the charger such that a power storage device attains a predetermined fully charged state based on charging power calculated using the second current detection value (full charge control).

6 Claims, 8 Drawing Sheets

FIG.2
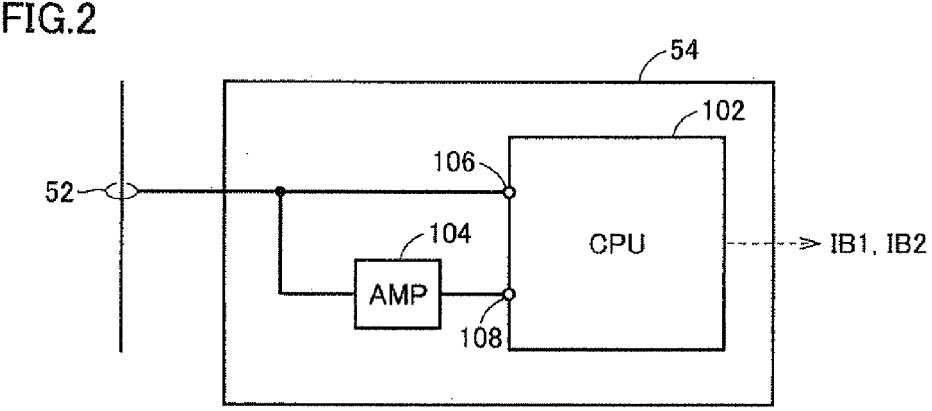
FIG.3
|  | RESOLUTION | MEASUREMENT RANGE | UPDATE CYCLE |
|---|---|---|---|
| IB1 | LOW | WIDE | SHORT |
| IB2 | HIGH | NARROW | LONG |
FIG.4
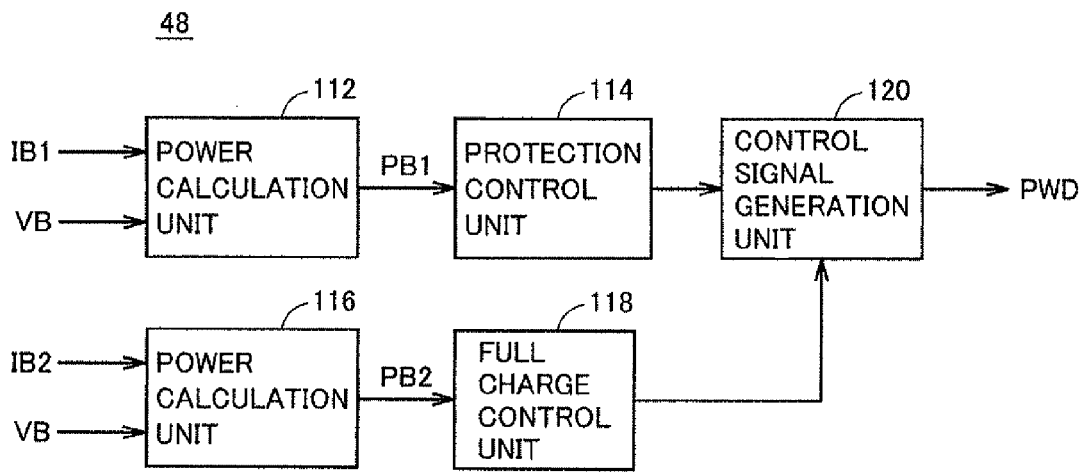

CHARGE CONTROL DEVICE FOR VEHICLE AND ELECTRIC POWERED VEHICLE PROVIDED WITH SAME

TECHNICAL FIELD

The present invention relates to a charge control device for a vehicle and an electric powered vehicle provided with the same, and more particularly relates to a charge control device for a vehicle configured such that a rechargeable power storage device mounted on the vehicle can be charged by a power supply outside the vehicle, and an electric powered vehicle provided with the same.

BACKGROUND ART

Japanese Patent Laying-Open No. 4-88837 (Patent Literature 1) discloses a charge controller controlling battery charging. In this charge controller, full charge is detected by detecting a voltage drop ($-\Delta V$) after full charge, and detection accuracy of $-\Delta V$ is varied in accordance with ratings of a battery to be charged, and the like. Accordingly, suitable charging can be performed depending on the type of battery (see Patent Literature 1).

CITATION LIST

Patent Literature

PTL 1: Japanese Patent Laying-Open No. 4-88837
PTL 2: Japanese Patent Laying-Open No. 7-194015

SUMMARY OF INVENTION

Technical Problem

The technique disclosed in Japanese Patent Laying-Open No. 4-88837 mentioned above is useful in that full charge of a power storage device represented by a secondary battery can be appropriately detected. However, during charge, it is required to protect the power storage device by reducing charging power promptly when charging power exceeds a predetermined limit value, in addition to correct detection of full charge.

A highly accurate electric power calculation is required for detection of full charge, while wide range and high speed electric power calculation is required for protecting the power storage device, however, the techniques disclosed in the above pieces of literature may be unable to satisfy these two requests simultaneously.

Moreover, in recent years, an electric vehicle, a hybrid vehicle, and the like are attracting attention as an electric powered vehicle configured to be capable of driving a motor for vehicle driving using electric power stored in the power storage device. For such a vehicle, a structure in which the power storage device is charged by a power supply outside the vehicle (hereinafter also referred to as "an external power supply", and further, charging of the power storage device by the external power supply also referred to as "external charge") has been proposed.

Here, since charging power during external charge is considerably smaller than charging and discharging power during traveling, sufficient detection accuracy may not be obtained if a sensor detection value suited to measure charging and discharging electric power during traveling is used as it is for full charge detection during external charge.

The present invention was therefore made to solve such a problem, and has an object to satisfy each request for reliable protection of a power storage device and correct detection of full charge in a vehicle configured such that a power storage device can be charged by an external power supply.

Solution to Problem

According to the present invention, a charge control device for a vehicle is a charge control device for a vehicle configured such that a rechargeable power storage device mounted on the vehicle can be charged by a power supply outside the vehicle, including a charger, a current detection unit and a control device. The charger is configured to convert electric power supplied from the power supply outside the vehicle in voltage to charge the power storage device. The current detection unit is configured to detect a current input to the power storage device to output a first detection value having a first resolution and a second detection value having a second resolution higher than the first resolution. The control device controls the charger based on the first and second detection values. The control device includes a protection control unit and a full charge control unit. When charging power calculated using the first detection value exceeds a predetermined limit value, the protection control unit controls the charger to reduce the charging power. The full charge control unit controls the charger such that the power storage device attains a predetermined fully charged state, based on charging power calculated using the second detection value.

Preferably, the current detection unit includes a sensor unit and an amplifying unit. The sensor unit is configured to output the first detection value. The amplifying unit multiplies the first detection value to output the second detection value.

Preferably, the current detection unit includes first and second current sensors. The first current sensor is configured to output the first detection value. The second current sensor is configured to output the second detection value.

Preferably, a range of the first detection value is wider than the range of the second detection value, and a detection cycle of the first detection value is shorter than the detection cycle of the second detection value.

Preferably, the charge control device for a vehicle further includes a voltage sensor for detecting a voltage of the power storage device. The full charge control unit controls the charger such that the charging power calculated using the second detection value is constant, and determines that the power storage device has attained the fully charged state when a detection value of the voltage sensor reaches a predetermined value.

Preferably, the charge control device for a vehicle further includes an input unit for instructing full charge of the power storage device. When the input unit is operated, the full charge control unit controls the charger such that the power storage device attains the predetermined fully charged state based on the charging power calculated using the second detection value.

Moreover, according to the present invention, an electric powered vehicle includes any charge control device as described above, and a motor generating a driving torque using electric power stored in a power storage device charged using the charge control device.

Advantageous Effects of Invention

In the present invention, the first detection value used for the protection control unit is relatively lower in resolution than the second detection value, and may produce a wide range and high speed current detection result. On the other hand, the second detection value used for the full charge control unit is relatively higher in resolution than the first detection value, and thus shows a highly accurate current detection result. Therefore, according to the present invention, each request for reliable protection of the power storage device and correct detection of full charge can be satisfied.

BRIEF DESCRIPTION OF DRAWINGS

FIG. 2 is a diagram showing an example of configuration of a monitoring unit shown in FIG. 1.

FIG. 3 is a diagram showing relatively and qualitatively properties of current detection values output from the monitoring unit shown in FIG. 2.

FIG. 4 is a functional block diagram of a charging ECU shown in FIG. 1.

DESCRIPTION OF EMBODIMENTS

Figure 1:
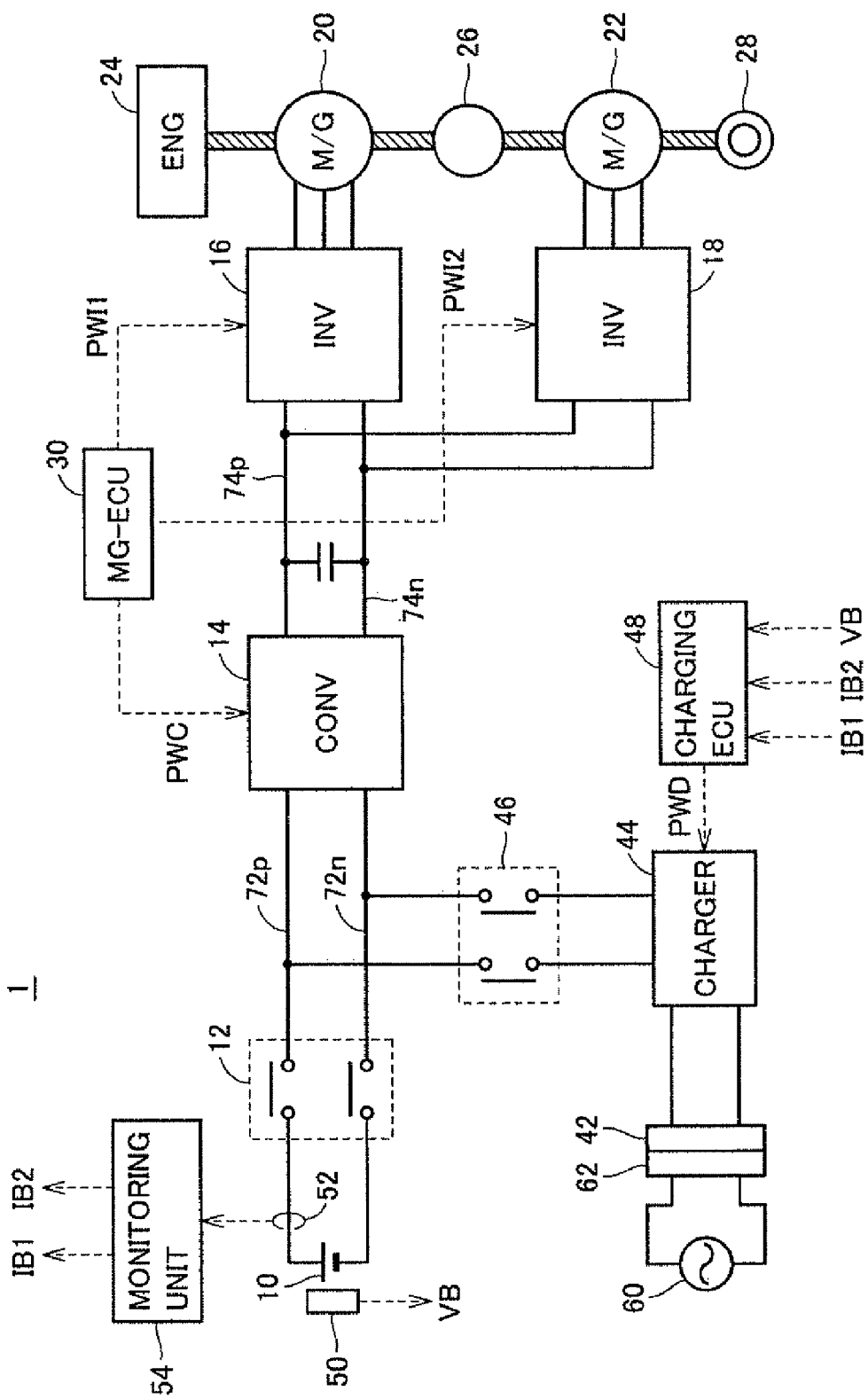
FIG. 1 is an overall block diagram of an electric powered vehicle according to a first embodiment of the present invention.

Hereinafter, embodiments of the present invention will be described in detail with reference to the drawings. It is noted that, in the drawings, the same or corresponding portions have the same reference characters allotted, and description thereof will not be repeated.

First Embodiment

FIG. 1 is an overall block diagram of an electric powered vehicle according to a first embodiment of the present invention. Referring to FIG. 1, this electric powered vehicle 1 includes a power storage device 10, a system main relay (hereinafter also referred to as "SMR (System Main Relay)") 12, a boost converter 14, inverters 16, 18, a motor-generator (hereinafter also referred to as "MG (Motor Generator)") 20, 22, an engine 24, a power split device 26, a driving wheel 28, and an MG-ECU (Electronic Control Unit) 30. Electric powered vehicle 1 also includes a charge inlet 42, a charger 44, a relay 46, a charging ECU 48, a voltage sensor 50, a current sensor 52, and a monitoring unit 54.

SMR 12 is provided between power storage device 10 and boost converter 14. Inverters 16, 18 are connected to boost converter 14 through a main positive bus 74p and a main negative bus 74n, respectively. Charger 44 is connected to a positive electrode line 72p and a negative electrode line 72n disposed between SMR 12 and boost converter 14, with relay 46 interposed therebetween. Charge inlet 42 is connected to the input side of charger 44.

Power storage device 10 is a rechargeable DC power supply, and is typically implemented by a lithium ion or similar secondary battery. Power storage device 10 supplies electric power to boost converter 14. Moreover, power storage device 10 receives electric power generated by MG 20 and/or 22 from boost converter 14 to be charged. Further, power storage device 10 is charged by charger 44 during charge (during external charge) of electric powered vehicle 1 by a power supply 60 outside the vehicle (e.g., a commercial power supply system).

Boost converter 14 boosts a voltage across main positive bus 74p and main negative bus 74n to be more than or equal to a voltage across positive electrode line 72p and negative electrode line 72n (i.e., a voltage of power storage device 10), based on a control signal PWC received from MG-ECU 30. This boost converter 14 is implemented by, for example, a current reversible DC chopper circuit provided with a reactor for energy storage.

Inverter 16 drives MG 20 based on a control signal PWI1 received from MG-ECU 30. Inverter 18 drives MG 22 based on a control signal PWI2 received from MG-ECU 30. Inverters 16, 18 are each implemented by, for example, a three-phase bridge circuit provided with a U-phase arm, a V-phase arm and a W-phase arm.

MGs 20, 22 are AC rotating electric machines, each implemented by, for example, a three-phase AC synchronous motor with a permanent magnet embedded in a rotor. The rotation shaft of MG 20 is connected to power split device 26, and the rotation shaft of MG 22 is coupled to driving wheel 28. Power split device 26 is implemented by a planetary gear formed of a sun gear, a pinion gear, a planetary carrier, and a ring gear. The rotation shaft of MG 20, the crankshaft of engine 24, and the driving shaft coupled to driving wheel 28 are connected to power split device 26, and power split device 26 distributes outputs of engine 24 to MG 20 and driving wheel 28.

MG-ECU 30 generates control signal PWC for driving boost converter 14 and control signals PWI1, PWI2 for driving MGs 20, 22, respectively, and outputs generated control signals PWC, PWI1 and PWI2 to boost converter 14, inverters 16 and 18, respectively.

Charge inlet 42 is configured to be connectable to a connector 62 connected to power supply 60 outside the vehicle, and receives AC power supplied from power supply 60. Charger 44 converts AC power supplied from power supply 60 into a predetermined charging voltage (DC) based on a control signal PWD received from charging ECU 48. Then, the electric power converted in voltage by charger 44 is supplied to power storage device 10 through relay 46, so that power storage device 10 is charged. Charger 44 is implemented by, for example, an AC/DC converter. Relay 46 is turned on during external charge, and is turned off while external charge is not executed.

Voltage sensor 50 detects a voltage VB of power storage device 10, and outputs the detection value to charging ECU 48. Current sensor 52 detects a current input/output to/from power storage device 10, and outputs a detection signal (analog signal) varying depending on the magnitude of current to monitoring unit 54.

Monitoring unit 54 receives the current detection signal (analog signal) from current sensor 52. Then, monitoring unit 54 generates a first current detection value IB1 having a predetermined first resolution and a second current detection value IB2 having a predetermined second resolution higher than the first resolution, and outputs generated first and second current detection values IB1,IB2 to charging ECU 48. It is noted that a specific configuration of monitoring unit 54 will be described later.

Charging ECU 48 generates control signal PWD for driving charger 44 during external charge based on first and second current detection values IB1, IB2 received from monitoring unit 54 and the detection value of voltage VB received from voltage sensor 50, and outputs generated control signal PWD to charger 44. More specifically, charging ECU 48 controls charger 44 to reduce charging power when charging power calculated using first current detection value IB1 exceeds a predetermined limit value. Charging ECU 48 also controls charger 44 such that power storage device 10 attains a predetermined fully charged state (e.g., 80% amount of charge with respect to the capacity of power storage device 10), based on charging power calculated using second current detection value IB2. It is noted that a configuration of charging ECU 48 will also be described later in detail.

FIG. 2 is a diagram showing an example of configuration of monitoring unit 54 shown in FIG. 1. Referring to FIG. 2, monitoring unit 54 includes a CPU (Central Processing Unit) 102 and an amplifier 104. Current sensor 52 is configured to be capable of detecting a large current (e.g., several hundred amperes) during traveling, and outputs an analog signal varying depending on the magnitude of detected current. The analog signal output from current sensor 52 is then input to an A/D (analog/digital) port 106 of CPU 102.

Here, the analog signal output from current sensor 52 is branched in its path for input to amplifier 104. Amplifier 104 multiplies the analog signal received from current sensor 52 with a predetermined magnification (e.g., 10×) for output. The analog signal multiplied with the predetermined magnification by amplifier 104 is then input to an A/D port 108 of CPU 102.

CPU 102 converts the analog signal received at A/D port 106 into a digital signal, and outputs the converted digital signal as current detection value IB1 to charging ECU 48 (FIG. 1). CPU 102 also converts the analog signal received at A/D port 108 into a digital signal, and outputs the converted digital signal as current detection value IB2 to charging ECU 48. It is noted that transmission from CPU 102 to charging ECU 48 is made by packet communication, for example.

FIG. 3 is a diagram showing relatively and qualitatively properties of current detection values IB1, IB2 output from monitoring unit 54 shown in FIG. 2. Referring to FIG. 3, current detection value IB1 obtained by digitally converting the analog signal output from current sensor 52 as it is has a low resolution, a wide measurement range, and a short update cycle (detection cycle) as compared to current detection value IB2. On the other hand, current detection value IB2 obtained by digitally converting the signal obtained by multiplying the analog signal output from current sensor 52 by amplifier 104 has a high resolution, a narrow measurement range, and a long update cycle as compared to current detection value IB1.

Specifically, current detection value IB1 gives priority to the wideness of measurement range and the shortness of update cycle, although the resolution is relatively low, while current detection value IB2 gives priority to the highness of resolution, although the measurement range is narrow and the update cycle is long. As will be described later, when executing charge control by charger 44, charging ECU 48 selectively uses above-described current detection values IB1, IB2 having different properties, depending on properties required for control.

FIG. 4 is a functional block diagram of charging ECU 48 shown in FIG. 1. Referring to FIG. 4, charging ECU 48 includes power calculation units 112, 116, a protection control unit 114, a full charge control unit 118, and a control signal generation unit 120.

Power calculation unit 112 calculates electric power PB1 representing charging power for power storage device 10, based on current detection value IB1 received from monitoring unit 54 (FIGS. 1, 2) and the detection value of voltage VB received from voltage sensor 50 (FIG. 1), and outputs calculated electric power PB1 to protection control unit 114.

Protection control unit 114 executes protection control for protecting power storage device 10 based on electric power PB1 received from power calculation unit 112. Specifically, protection control unit 114 outputs a command instructing a reduction in charging power supplied from charger 44 to power storage device 10, to control signal generation unit 120, when electric power PB1 exceeds a limit value Win of input electric power to power storage device 10.

Power calculation unit 116 calculates electric power PB2 representing charging power for power storage device 10 based on current detection value IB2 received from monitoring unit 54 and the detection value of voltage VB received from voltage sensor 50, and outputs calculated electric power PB2 to full charge control unit 118.

Full charge control unit 118 executes full charge control for charging power storage device 10 to a predetermined fully charged state (e.g., SOC (State Of Charge)=80%) based on electric power PB2 received from power calculation unit 116. Specifically, full charge control unit 118 outputs, to control signal generation unit 120, a command instructing an increase/a reduction in charging power such that charging power supplied from charger 44 to power storage device 10 attains a predetermined constant value, based on electric power PB2 calculated by power calculation unit 116. Full charge control unit 118 then estimates SOC of power storage device 10 by a technique to be described later based on voltage VB (equivalent to closed circuit voltage (CCV: Closed Circuit Voltage)) when charging power for power storage device 10 has the above-mentioned constant value, and when SOC reaches the predetermined fully charged state, outputs a command instructing a stop of charging to control signal generation unit 120.

Control signal generation unit 120 generates control signal PWD for driving charger 44 in accordance with the instruction received from protection control unit 114, and outputs generated control signal PWD to charger 44. Control signal generation unit 120 also generates control signal PWD in accordance with the instruction received from full charge control unit 118, and outputs generated control signal PWD to charger 44. Priority is given to the instruction received from protection control unit 114 when instructions are received from both protection control unit 114 and full charge control unit 118.

Figure 5:
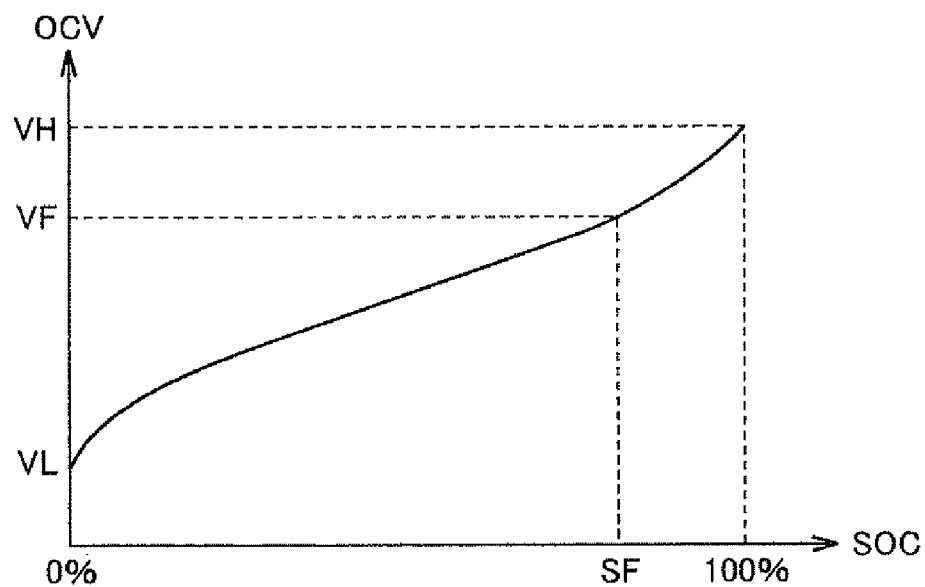
FIG. 5 is a diagram showing a relationship between OCV and SOC of a power storage device.
Figure 6:
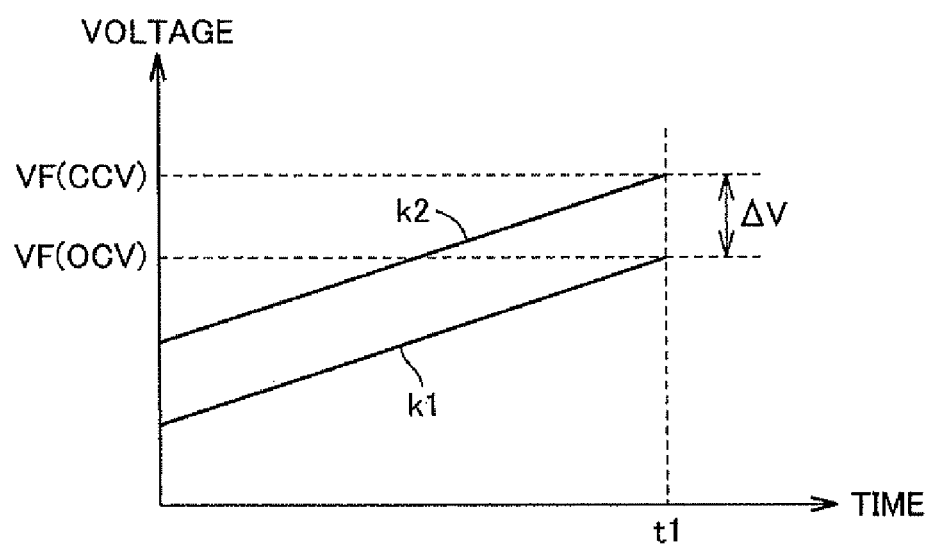
FIG. 6 is a diagram showing a relationship between OCV and CCV of the power storage device.

FIGS. 5 and 6 are diagrams for explaining a technique for estimating SOC of power storage device 10 according to the first embodiment. FIG. 5 is a diagram showing a relationship between an open circuit voltage (OCV: Open Circuit Voltage) and SOC of power storage device 10. Referring to FIG. 5, SOC of power storage device 10 is unique to OCV of power storage device 10. Therefore, representing the predetermined fully charged state as SF, it can be determined that SOC has reached SF when OCV reaches VF corresponding to SOC=SF.

FIG. 6 is a diagram showing a relationship between OCV and CCV of power storage device 10. Referring to FIG. 6, a line k1 represents OCV of power storage device 10, and a line k2 represents CCV of power storage device 10. During charge of power storage device 10 in which charging current flows, voltage VB detected by voltage sensor 50 is CCV, and CCV is higher than OCV by ΔV due to the internal resistance of power storage device 10 and/or the influence of polarization.

Here, when charging power for power storage device 10 varies, ΔV will also vary, so that OCV will be difficult to estimate from CCV, however, according to this first embodiment, charger 44 is controlled such that charging power attains a predetermined constant value during external charge. Then, ΔV when charging power has the predetermined constant value is calculated previously, and OCV is estimated based on CCV detected by voltage sensor 50. More specifically, ΔV when charging power has the predetermined constant value is calculated previously, and when voltage VB as a detection value of voltage sensor 50 reaches VF (CCV) obtained by adding ΔV to VF (OCV) corresponding to SOC=SF, it is determined that SOC of power storage device 10 has reached predetermined fully charged state SF.

Therefore, in this first embodiment, it is important to correctly control charge electric power for power storage device 10 to have the predetermined constant value. Thus, in this first embodiment, current detection value IB2 having a high resolution shall be generated in addition to current detection value IB1 having a low resolution (although having a wide measurement range and a short update cycle (detection cycle)) used for protection control of power storage device 10, and current detection value IB2 shall be used for full charge control, thereby improving control accuracy in full charge.

Figure 7:
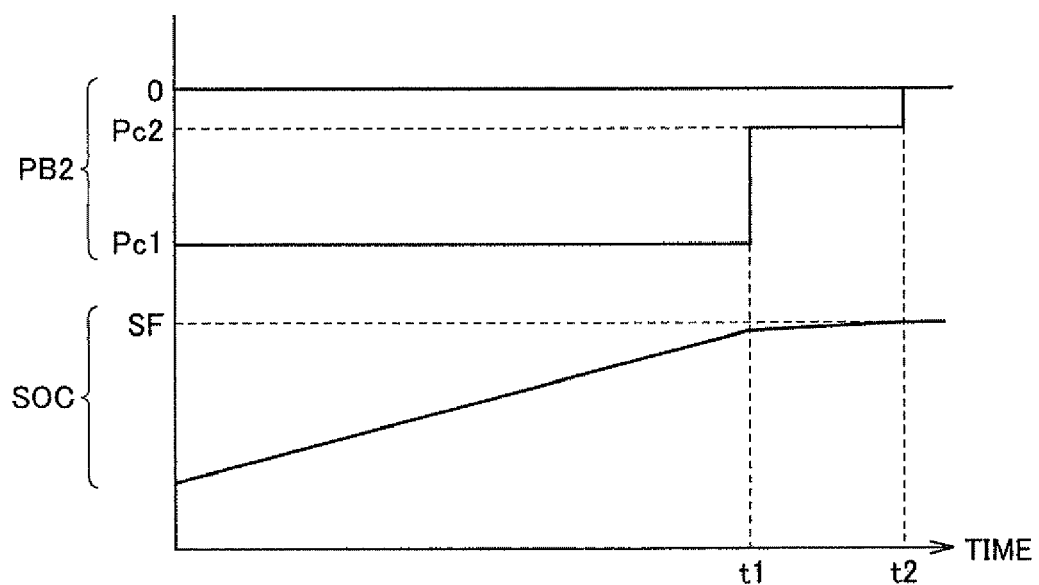
FIG. 7 is a diagram showing charging power and SOC during full charge control.

FIG. 7 is a diagram showing charging power and SOC during full charge control. Referring to FIG. 7, full charge control is performed in two steps. Specifically, until time t1 immediately before SOC reaches predetermined fully charged state SF, constant electric power charge (hereinafter also referred to as "CP (Constant Power) charge") is executed such that electric power PB2 calculated using current detection value IB2 having a high resolution attains a constant value Pc1, and after time t1, CP charge is executed such that electric power PB2 attains a constant value Pc2 (|Pc2|<|Pc1|). Then, at time t2, when CCV detected by voltage sensor 50 (FIG. 1) reaches VF (CCV) corresponding to SOC=SF, it is determined that SOC of power storage device 10 has reached SF, and external charge is terminated.

Figure 8:
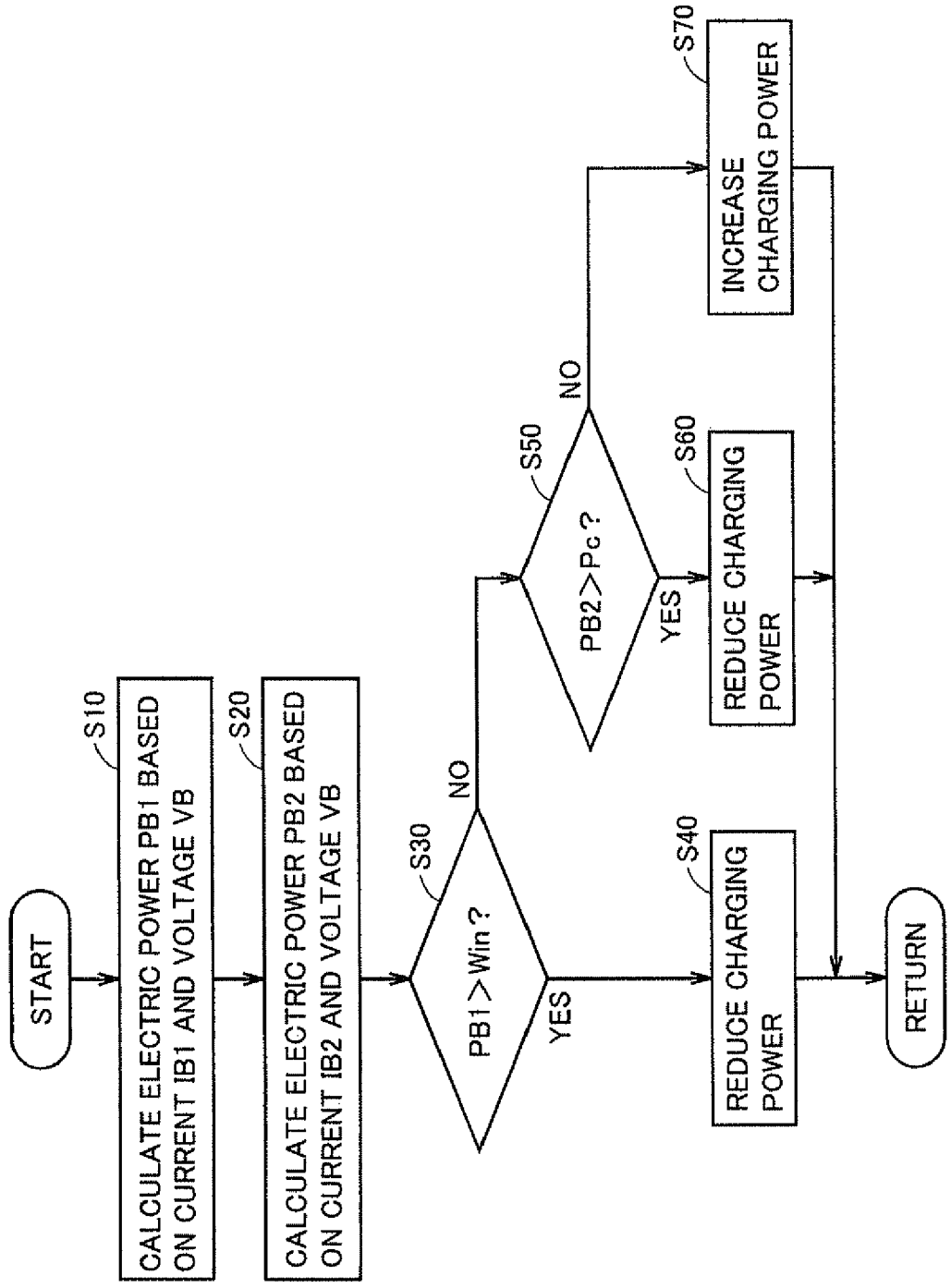
FIG. 8 is a flowchart for explaining electric power control during external charge executed by the charging ECU.

FIG. 8 is a flowchart for explaining electric power control during external charge executed by charging ECU 48. It is noted that the process of this flowchart is executed every predetermined time or every time predetermined conditions hold during execution of external charge.

Referring to FIG. 8, charging ECU 48 calculates electric power PB1 based on current detection value IB1 received from monitoring unit 54 and the detection value of voltage VB received from voltage sensor 50 (Step S10). Further, charging ECU 48 calculates electric power PB2 based on current detection value IB2 received from monitoring unit 54 and the detection value of voltage VB received from voltage sensor 50 (Step S20).

Then, charging ECU 48 first determines whether or not electric power PB1 has exceeded limit value Win of input electric power to power storage device 10 (Step S30). When it is determined that electric power PB1 has exceeded limit value Win (YES in Step S30), charging ECU 48 outputs a command instructing a reduction in charging power to charger 44 to reduce charging power to be supplied to power storage device 10 (Step S40).

On the other hand, when it is determined in Step S30 that electric power PB1 is less than or equal to limit value Win (NO in Step S30), charging ECU 48 determines whether or not electric power PB2 is larger than Pc representing a target value of charging power (Step S50). When it is determined that electric power PB2 is larger than Pc (YES in Step S50), charging ECU 48 outputs a command instructing a reduction in charging power to charger 44 to reduce charging power to be supplied to power storage device 10 (Step S60). On the other hand, when it is determined in Step S50 that electric power PB2 is less than or equal to Pc (NO in Step S50), charging ECU 48 outputs a command instructing an increase in charging power to charger 44 to increase charging power to be supplied to power storage device 10 (Step S70). Charging power for power storage device 10 is thereby adjusted to Pc with high accuracy based on electric power PB2.

It is noted that, in the above description, external charge shall be CP charge, however, the second step may be constant voltage charge (hereinafter also referred to as "CV (Constant Voltage) charge").

Figure 9:
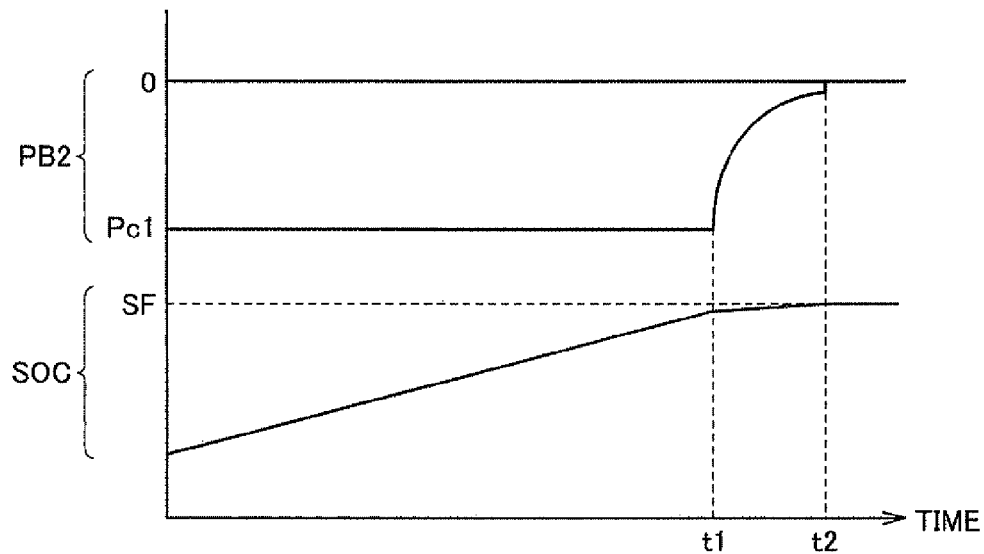
FIG. 9 is a diagram showing charging power and SOC when CV charge is executed.

FIG. 9 is a diagram showing charging power and SOC when CV charge is executed. Referring to FIG. 9, until time t1 immediately before SOC reaches predetermined fully charged state SF, CP charge is executed such that electric power PB2 calculated using current detection value IB2 having a high resolution attains a constant value Pc1, and after time t1, CV charge in which CCV corresponding to SOC=SF is a target voltage is executed. Then, charging power (PB2) is reduced as SOC approaches fully charged state SF, and when charging power (PB2) becomes minute at time t2, it is determined that the fully charged state has been brought about, and external charge is terminated.

Here, in this CV charge as well, minute charging power when the fully charged state approaches can be measured by using, for control, electric power PB2 calculated using current detection value IB2 having a high resolution generated independently of current detection value IB1 for protection control, so that SOC can be brought much closer to predetermined fully charged state SF.

Moreover, in addition to the above-described protection control and full charge control, the full charge capacity of power storage device 10 can also be calculated during external charge.

Figure 10:
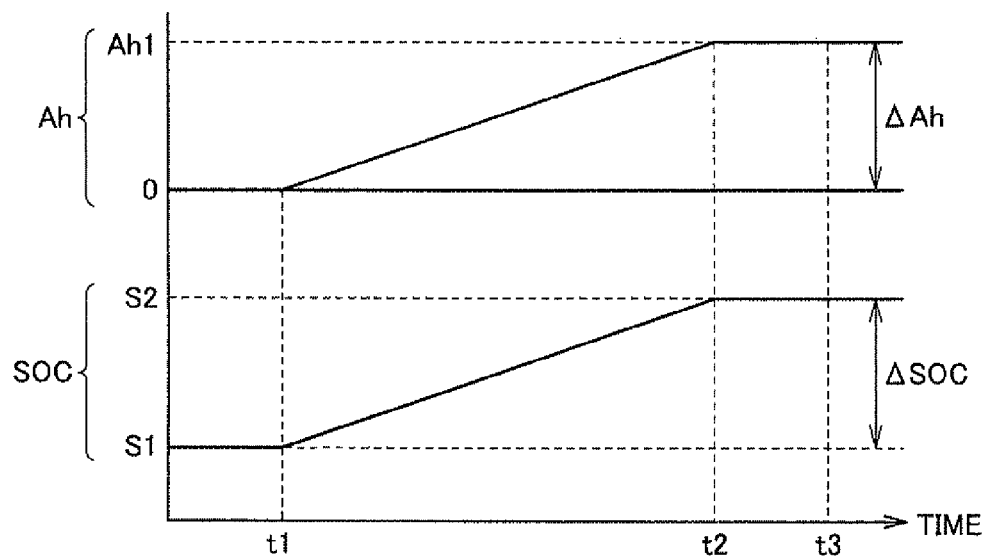
FIG. 10 is a diagram for explaining a method of calculating a full charge capacity.

FIG. 10 is a diagram for explaining a method of calculating the full charge capacity. Referring to FIG. 10, Ah represents an integrated amount of charging current to power storage device 10. Above-described current detection value IB2 having a high resolution generated independently of current detection value IB1 for protection control is integrated from time t1 to t2 during which external charge is executed, thereby calculating a current integrated amount ΔAh during external charge.

On the other hand, OCV before time t1 at which external charge is started is detected by voltage sensor 50, and SOC (S1) before the start of external charge is estimated based on the detected OCV. Also, OCV is detected by voltage sensor 50 at time t3 after time t2 at which external charge is terminated, and SOC (S2) after the termination of external charge is estimated based on the detected OCV.

Then, current integrated amount ΔAh during external charge is divided by an SOC difference ΔSOC before and after external charge (=S2−S1), so that the full charge capacity of power storage device 10 can be calculated.

Here, in the calculation of this full charge capacity as well, electric power PB2 calculated using current detection value IB2 having a high resolution generated independently of current detection value IB1 for protection control is used as described above, so that current integrated amount ΔAh can be calculated more correctly, and the full charge capacity can be calculated more correctly.

As described above, in this first embodiment, current detection value IB1 used for protection control of power storage device 10 is relatively lower in resolution than current detection value IB2, and may produce a wide range and high speed current detection result. On the other hand, since current detection value IB2 used for full charge control of power storage device 10 is relatively higher in resolution than current detection value IB1, and thus shows a highly accurate current detection result. Therefore, according to this first embodiment, each request for reliable protection of power storage device 10 and correct detection of full charge can be satisfied.

In addition, according to this first embodiment, highly accurate CP charge can be executed using electric power PB2 calculated using current detection value IB2 having a high resolution different from current detection value IB1 for protection control.

Moreover, in this first embodiment, when CV charge is executed, minute charging power when the fully charged state approaches can be measured by using, for control, electric power PB2 calculated using current detection value IB2 having a high resolution. Therefore, according to this first embodiment, SOC can be brought much closer to predetermined fully charged state SF during CV charge.

Further, in this first embodiment, when calculating the full charge capacity of power storage device 10 by dividing the integrated current amount during external charge by the SOC difference before and after external charge, the integrated current amount can be calculated more correctly by using electric power PB2 calculated by using current detection value IB2 having a high resolution. Therefore, according to this first embodiment, the full charge capacity of power storage device 10 can be calculated more correctly.

Second Embodiment

Figure 11:
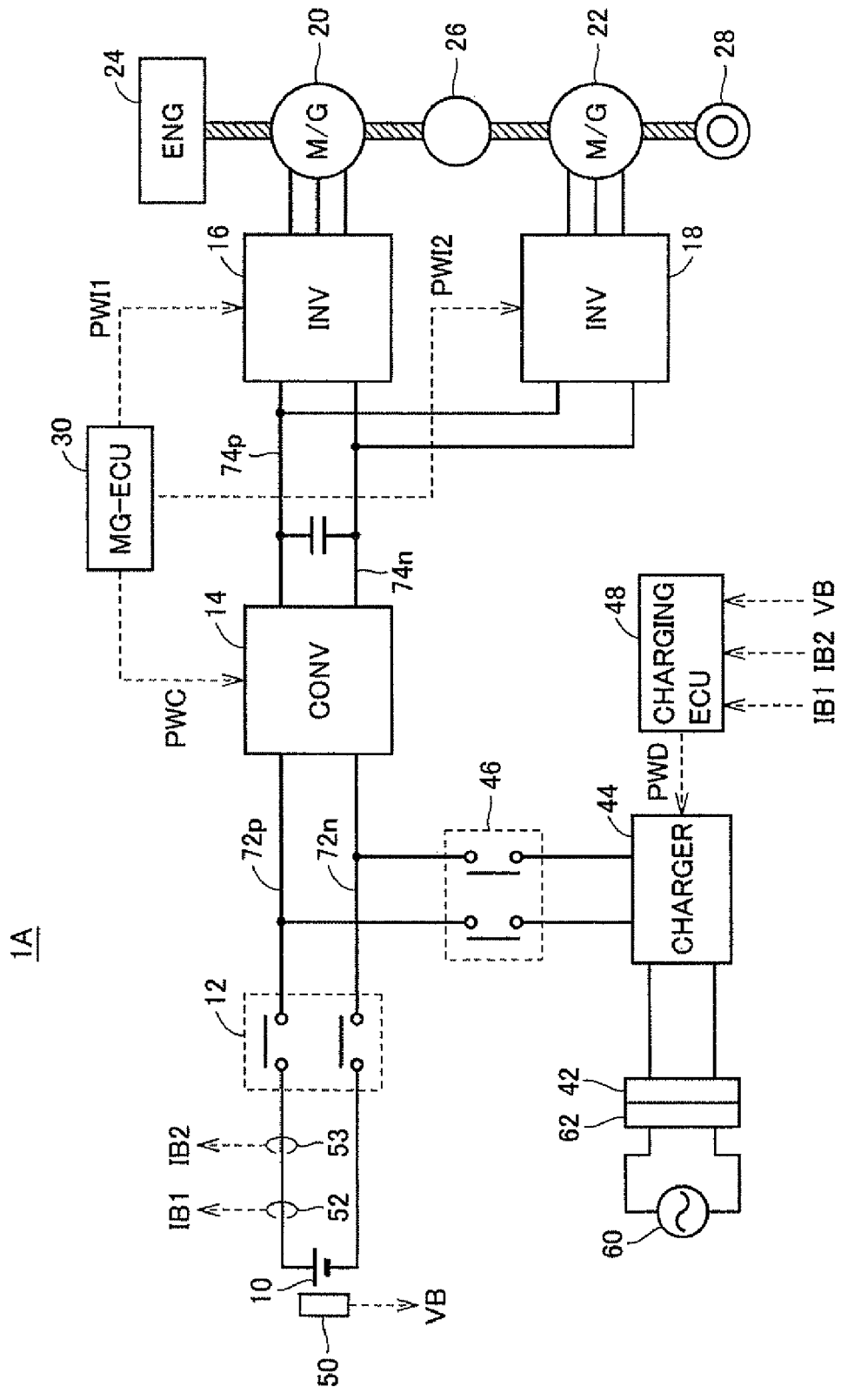
FIG. 11 is an overall block diagram of an electric powered vehicle according to a second embodiment.

FIG. 11 is an overall block diagram of an electric powered vehicle according to a second embodiment. Referring to FIG. 11, this electric powered vehicle 1A does not include monitoring unit 54 in the configuration of electric powered vehicle 1 according to the first embodiment shown in FIG. 1, but further includes a current sensor 53.

Current sensor 53 detects a current input/output to/from power storage device 10, and outputs a detected value to charging ECU 48. It is noted that current sensor 52 also detects a current input/output to/from power storage device 10, and outputs a detected value to charging ECU 48.

Here, current sensors 52, 53 differ in detection performance from each other. Specifically, as shown in FIG. 3, current sensor 52 outputs current detection value IB1 having a low resolution, a wide measurement range, and a short update cycle (detection cycle) as compared to current sensor 53. On the other hand, current sensor 53 outputs current detection value IB2 having a high resolution, a narrow measurement range, and a long update cycle (detection cycle) as compared to current sensor 52.

Specifically, in the first embodiment, current detection value IB2 shall be generated by multiplying the analog signal output from current sensor 52 with a predetermined magnification using amplifier 104 (FIG. 2), however, in this second embodiment, current sensor 53 capable of outputting current detection value IB2 having a high resolution is provided separately.

It is noted that the remaining configuration of electric powered vehicle 1A is identical to that of electric powered vehicle 1 according to the first embodiment.

In this second embodiment, similar effects to those of the first embodiment can also be achieved.

Third Embodiment

Figure 12:
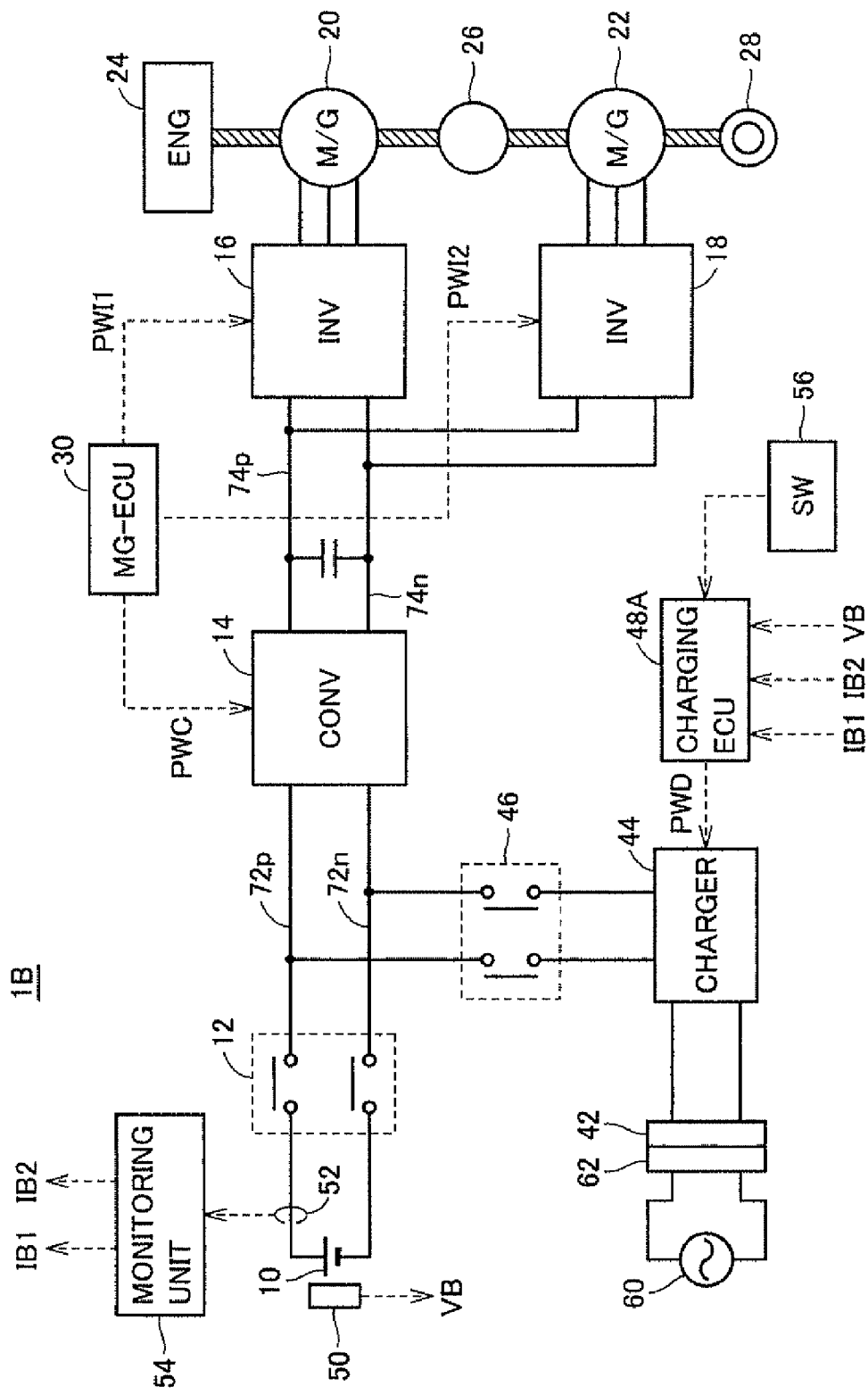
FIG. 12 is an overall block diagram of an electric powered vehicle according to a third embodiment.

FIG. 12 is an overall block diagram of an electric powered vehicle according to a third embodiment. Referring to FIG. 12, this electric powered vehicle 1B further includes a full charge instruction switch 56 and includes a charging ECU 48A instead of charging ECU 48 in the configuration of electric powered vehicle 1 according to the first embodiment shown in FIG. 1.

Full charge instruction switch 56 is an input device configured to be operable by a user of the vehicle, for the user to instruct execution of the above-described full charge control during external charge. When operated by the user, full charge instruction switch 56 outputs a command instructing execution of full charge control to charging ECU 48A.

Upon receipt of the above-mentioned command from full charge instruction switch 56, charging ECU 48A executes the above-described full charge control using current detection value IB2 having a high resolution received from monitoring unit 54. It is noted that when full charge instruction switch 56 is not operated, charging ECU 48A controls charger 44 using current detection value IB1 such that charging power corresponds to a predetermined value.

It is noted that the remaining configuration of electric powered vehicle 1B is identical to that of electric powered vehicle 1 according to the first embodiment.

It is noted that, although not particularly illustrated, full charge instruction switch 56 may be further provided in the configuration of electric powered vehicle 1A according to the second embodiment shown in FIG. 11.

According to this third embodiment, highly accurate full charge control can be carried out in accordance with a user's request.

It is noted that, in each of the above-described embodiments, the external power supply shall be an AC power supply, such as a commercial power supply system, however, the external power supply may be a DC power supply. In this case, charger 44 is implemented by a DC/DC converter.

Moreover, the above description addresses series/parallel type hybrid vehicle in which motive power of engine 24 can be divided by power split device 26 for transfer to driving wheel 28 and MG 20, however, the present invention is also applicable to another type of hybrid vehicle. For example, the present invention is also applicable to a so-called series type hybrid vehicle in which engine 24 is used only for driving MG 20 and driving force for the vehicle is generated only by MG 22, a hybrid vehicle in which only regenerative energy out of kinetic energy generated by the engine is collected as electrical energy, a motor assist-type hybrid vehicle mainly powered by the engine and assisted by a motor as necessary, and the like.

Further, the present invention is also applicable to an electric vehicle traveling only with electric power without engine 24, or a fuel cell vehicle further including a fuel cell as a DC power supply in addition to power storage device 10. Furthermore, the present invention is also applicable to an electric powered vehicle not including boost converter 14.

It is noted that, in the above description, current sensor 52 and monitoring unit 54 constitute an embodiment of a "current detection unit" according to the present invention, and current sensors 52, 53 also constitute an embodiment of the "current detection unit" according to the present invention. Moreover, charging ECUs 48, 48A correspond to an embodiment of a "control device" according to the present invention. Further, current sensor 52 corresponds to an embodiment of a "sensor unit" according to the present invention, and amplifier 104 corresponds to an embodiment of an "amplifying unit" according to the present invention.

Further, current sensor 52 corresponds to an embodiment of a "first current sensor" according to the present invention, and current sensor 53 corresponds to an embodiment of a "second current sensor" according to the present invention. Furthermore, full charge instruction switch 56 corresponds to an embodiment of an "input unit" according to the present invention, and MG 22 corresponds to an embodiment of a "motor" according to the present invention.

It should be understood that the embodiments disclosed herein are illustrative and non-restrictive in every respect. The scope of the present invention is defined by the terms of the claims, rather than the embodiments above, and is intended to include any changes within the meaning and scope equivalent to the terms of the claims.

REFERENCE SIGNS LIST

1, 1A, 1B electric powered vehicle; 10 power storage device; 12 SMR; 14 boost converter; 16, 18 inverter; 20, 22 MG; 24 engine; 26 power split device; 28 driving wheel; 30 MG-ECU; 42 charge inlet; 44 charger; 46 relay; 48, 48A charging ECU; 50 voltage sensor; 52, 53 current sensor; 54 monitoring unit; 56 full charge instruction switch; 60 AC power supply; 62 connector; 72p positive electrode line; 72n negative electrode line; 74p main positive bus; 74n main negative bus; 102 CPU; 104 amplifier; 106, 108 A/D port; 112, 116 power calculation unit; 114 protection control unit; 118 full charge control unit; 120 control signal generation unit.

The invention claimed is:

1. A charge control device for a vehicle configured such that a rechargeable power storage device mounted on the vehicle can be charged by a power supply outside the vehicle, comprising:
   a charger configured to convert electric power supplied from said power supply in voltage to charge said power storage device;
   a current detection unit configured to detect a current input to said power storage device to output a first detection value having a first resolution and a second detection value having a second resolution higher than said first resolution; and
   a control device controlling said charger based on said first and second detection values,
   a range of said first detection value being wider than the range of said second detection value, and
   a detection cycle of said first detection value being shorter than the detection cycle of said second detection value,
   said control device including
   a protection control unit controlling, when charging power calculated using said first detection value exceeds a predetermined limit value, said charger to reduce said charging power, and
   a full charge control unit controlling said charger such that said power storage device attains a predetermined fully charged state, based on charging power calculated using said second detection value.

2. The charge control device for a vehicle according to claim 1, wherein said current detection unit includes
   a sensor unit configured to output said first detection value, and
   an amplifying unit multiplying said first detection value to output said second detection value.

3. The charge control device for a vehicle according to claim 1, wherein said current detection unit includes
   a first current sensor configured to output said first detection value, and
   a second current sensor configured to output said second detection value.

4. The charge control device for a vehicle according to claim 1, further comprising a voltage sensor for detecting a voltage of said power storage device, wherein
   said full charge control unit controls said charger such that the charging power calculated using said second detection value is constant, and determines that said power storage device has attained the fully charged state when a detection value of said voltage sensor reaches a predetermined value.

5. The charge control device for a vehicle according to claim 1, further comprising an input unit for instructing full charge of said power storage device, wherein
   when said input unit is operated, said full charge control unit controls said charger such that said power storage device attains the predetermined fully charged state, based on the charging power calculated using said second detection value.

6. An electric powered vehicle comprising:
   the charge control device defined in claim 1; and
   a motor generating a driving torque using electric power stored in a power storage device charged using said charge control device.

* * * * *